United States Patent
Baerresen

[15] 3,684,183
[45] Aug. 15, 1972

[54] THRUST CONTROLLING APPARATUS

[72] Inventor: Richard B. Baerresen, Chula Vista, Calif.

[73] Assignee: Rohr Corporation, Chula Vista, Calif.

[22] Filed: Sept. 16, 1970

[21] Appl. No.: 72,579

[52] U.S. Cl. ....239/265.19, 239/265.29, 239/265.37
[51] Int. Cl. .......................B63h 11/10, B64c 15/00
[58] Field of Search.......239/265.19, 265.33, 265.37, 239/265.39, 265.43, 265.25, 265.27

[56] References Cited

UNITED STATES PATENTS

| | | | |
|---|---|---|---|
| 3,095,697 | 7/1963 | Reinhart | 239/265.27 |
| 3,068,646 | 12/1962 | Fletcher | 239/265.29 |
| 3,492,821 | 2/1970 | Monagham et al. | 239/265.29 |
| 3,113,428 | 12/1963 | Colley et al. | 239/265.27 |
| 3,020,712 | 2/1962 | Dolliver | 239/265.19 |

Primary Examiner—Lloyd L. King
Attorney—George E. Pearson

[57] ABSTRACT

Aft portion of jet engine shroud extends rearward beyond exit end of jet nozzle to surround and control exhaust gas stream. Passages through aft portion of shroud provide exit path for exhaust stream for thrust reversal. Closure members for passages move forward into notches to block flow, and are deployed aft to allow flow. A blocker door swings on transverse pivot from stowed position inward of forward end of each passage through intermediate modulating positions to full blocking position wherein doors join to form forwardly convex cone directing entire gas flow outwardly through passages exposed by deploying closure members. Forward ends of closure members mate with doors to form continuous deflecting surface and impart forward flow component to deflected gases to produce reverse thrust. Closure members and blocker doors may be operated independently if desired to provide variable thrust control during flight.

13 Claims, 5 Drawing Figures

INVENTOR.
R. BAERRESEN

BY

*George E. Pearson*
ATTORNEY

INVENTOR.
R. BAERRESEN

PATENTED AUG 15 1972

INVENTOR.
R. BAERRESEN

BY George E. Pearson

ATTORNEY

THRUST CONTROLLING APPARATUS

BACKGROUND OF THE INVENTION

This invention lies in the field of gas turbine engines, more commonly called jet engines, which produce reaction thrust be ejecting a high velocity stream of gas from the exhaust nozzle of the gas turbine. Airplanes driven by jet engines fly and land at much higher speeds than propeller driven aircraft. Their high landing speed puts a great burden on the wheel brakes and of course they do not have propellers which are readily reversible to produce reverse thrust. Therefore it is necessary to provide apparatus to reverse the gas stream to accomplish this result.

It is also highly desirable to be able to control effective thrust in flight. This is particularly so in the case of tactical military airplanes, which may be required to decelerate rapidly in combat maneuvers or limit their speed in steep dives in bombing operations. Conventionally, speed brakes are used for this purpose.

Various types of thrust reversers have been in use for many years, primarily to reduce landing run, although some have been successfully used in flight to reduce forward speed more rapidly than by throttling the engine. All of them utilize a basic principle of blocking the rearward flow of the exhaust gas stream and diverting it laterally. If the stream has no forward component it will act in the manner of a speed brake by interference with the free air stream. Normally, however, the stream is directed substantially forwardly to produce an actual reverse thrust. One common type uses a pair of deflectors which meet externally behind the nozzle to divert the stream laterally in opposite directions, usually with a forward component. Another similar type has doors mounted within the nozzle to block flow, lateral openings in the nozzle, and doors or deflectors which normally cover these openings, but may be swung outward to uncover the openings and direct the diverted streams laterally and forwardly. In another type, doors within the nozzle may be moved to block flow, and cascade passages are uncovered in the side walls to allow the gas to issue laterally and forwardly.

All of these systems work reasonably well but they have various drawbacks. They are difficult to modulate and normally are used only in fully deployed position. The external target type, with deflectors behind the nozzle, requires considerable supporting structure and usually has larger deflectors than is desirable. Also, it is difficult to arrange a pivotal mounting which will make them "fail-safe"; i.e., mounted so that in the event the actuating mechanism fails they will be urged by the gas stream toward stowed position. The other types have rather complicated mechanism which is subject to possible trouble or failure.

SUMMARY OF THE INVENTION

The present invention accomplishes the desirable results mentioned above and is adaptable to all types of jet engines. The construction produces a satisfactorily high thrust reversal factor, and can be modulated for intermediate degrees of reversal. It comprises a relatively small number of components which are rugged and dependable. In its generic form the invention is embodied in an elongate shroud of generally annular cross section which is connected to and surrounds the engine, the aft portion of the shroud extending rearward beyong the exit end of the nozzle to surround and control the exhaust gas stream. A plurality of peripherally spaced outflow passages are formed through the wall of the shroud aft of the plane of the exit end of the nozzle, the forward end of each passage diverging forward.

A closure member is provided for each passage and is mounted for axial movement between stowed position with its forward end in contact with the forward end of the passage and an aft deployed position uncovering the passage. Its forward end comprises a surface which diverges forwardly at substantially the same angle as the forward end of the passage. It mates with the passage in stowed position to form a substantial seal, and in its deployed position it defines the aft wall of the passage. Since the two surfaces are angled forwardly, they impart a forward flow component to the exhaust gas issuing through the passages during thrust reversal.

A blocker door is provided for each passage and these doors are pivoted about transverse axes to swing fore and aft between stowed and deployed positions. In stowed position each door underlies its respective stowed closure member and defines a portion of the inner wall of the shroud as well as substantially closing the inner wall of the passage. The trailing edges of the doors are tapered rearward to a point and when the doors swing rearward and inward to deployed position, the trailing edges meet to block rearward flow out of the shroud. The pivots are so located with respect to the lengths of the doors that the latter swing, when fully deployed, to a position forming a forwardly convex cone which diverts the exhaust stream outward and rearward to the passages. Also, in this position, the leading edges of the doors have swung far enough to engage the diverging forward edges of the closure members to form a continuous reverse curved guide path for the exhaust stream. The closure members preferably may be operated independently of the doors so that they may be translated partially or fully aft before the doors are deployed. However, if desired the closure members and doors may be operated synchronously by a single control, which is suitable for some installations, and is accomplished by simpler and less expensive mechanism.

In one form, the shroud may be the aft end of the fuselage of an airplane and provided with conventional upper vertical and horizontal tail surfaces as shown in FIG. 3. In this case there are three passages, three doors, and three closure members. One passage is located below the horizontal tail surfaces and the other two passages are directed angularly upwardly and outwardly so that the exhaust gas issuing from the passages will clear the tail surfaces.

The illustrative construction with independent controls for the closure members and doors is highly suitable for military maneuvers such as steep dives and carrier landings during which it may be desirable to produce a high degree of deceleration followed by a sudden demand for full power. Throttling the engine is undesirable because it produces insufficient deceleration, and more importantly because it takes many seconds to restore full power. With the present modulatable thrust reverser, the engine may continue to operate at a high throttle setting while deceleration is

BRIEF DESCRIPTION OF THE DRAWINGS

Various advantages and features of novelty will become apparent as the description proceeds in conjunction with the accompanying drawings, in which.

DETAILED DESCRIPTION OF THE DRAWINGS

Figure 1:
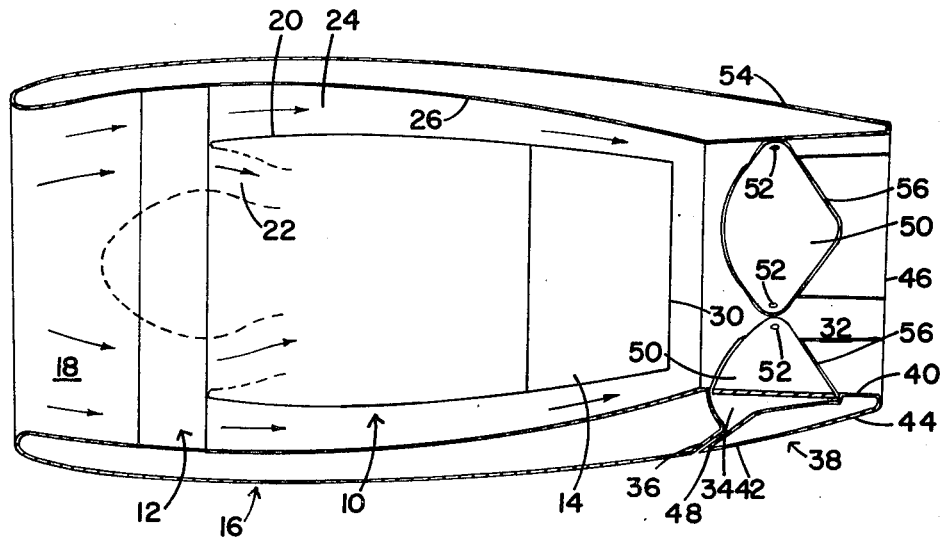
FIG. 1 is a schematic longitudinal sectional view of a jet engine nacelle installation embodying the present invention.
Figure 2:
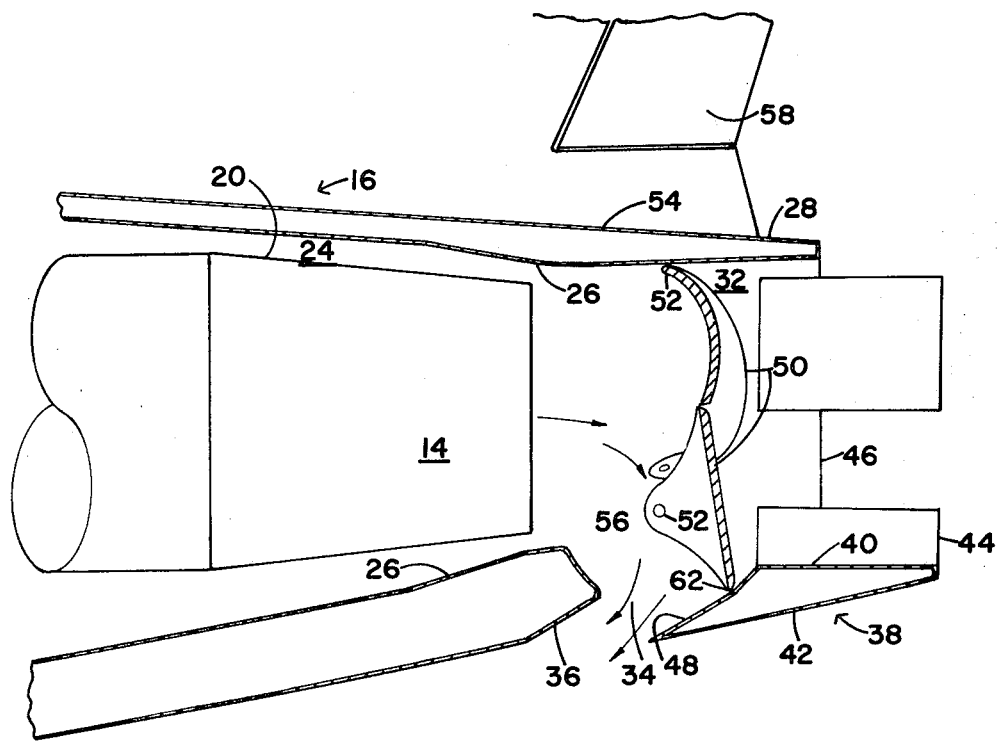
FIG. 2 is a fragmentary view similar to FIG. 1 showing the aft portion thereof with the components in thrust reversing position.
Figure 3:
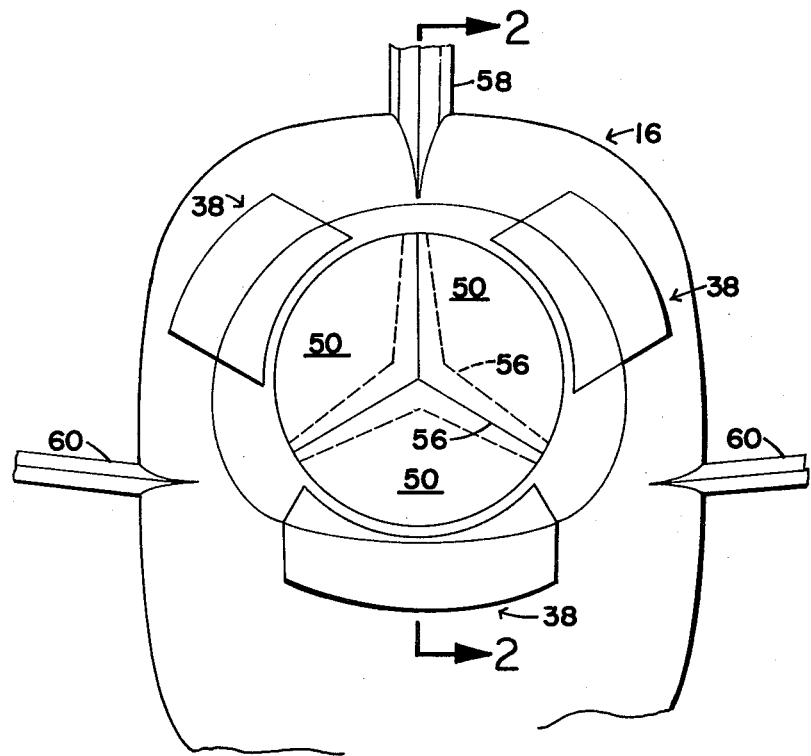
FIG. 3 is a schematic rear elevational view of the apparatus as shown in FIG. 2.

The general arrangement schematically illustrated in FIG. 1 shows the apparatus in its relation to other elements of a typical jet engine nacelle installation. The engine 10, having a longitudinal fore and aft axis of rotation, has mounted on its forward end an axial flow fan 12, and is provided at its aft end with a tail pipe or nozzle 14 for ejecting the products of combustion from the engine. A shroud 16 is provided to surround the components of the engine. The shroud may be a portion of a fuselage or wing or other aircraft structure but for simplicity is shown in FIG. 1 as having the form of a typical engine nacelle which is generally annular in cross section and generally coaxial with the engine. Its embodiment in the tail portion of a fuselage is illustrated in FIGS. 2 and 3.

In FIG. 1, the forward portion 18 of the shroud extends forward or upstream of the fan to provide a conventional entry throat for the flow of air to the fan. As shown, the intermediate portion of the shroud is radially spaced from the engine and the latter is surrounded by a shell 20. This shell splits the air received from the fan, and the radially inner portion of the air flows through passage 22 to the compressor of the turbofan engine. The radially outer portion of the fan air flows rearward through the annular passage 24 defined by shell 20 and the inner wall 26 of the shroud. Thus the installation is for a fan or by-pass type engine, although the invention is applicable in the same way to a conventional jet engine installation.

The aft portion 28 of the shroud 16 extends rearward beyond the exit end 30 of the nozzle to define a mixing zone 32 for mixing turbine exhaust gases with fan air, or merely a control zone in the case of a conventional turbine. A plurality of notched passages 34, preferably three, are formed in the aft end of the wall of the shroud 16 aft of the lateral plane of the exit end 30 of the nozzle, and are spaced at selected intervals around the periphery These passages extend entirely through the double wall of the shroud, and the forward end 36 of each notched passage is formed as a flow guide diverging forwardly and outwardly.

A closure member 38 is provided to fit into and close each passage 34, and is formed as a complementary portion of the shroud into which it fits, having an inner wall 40, an outer wall 42, and a trailing edge 44 which are substantially co-extensive with corresponding portions of the shroud 16 when the closure member 38 is in its forward stowed position as shown in FIG. 1. The forward end of each closure member defines a substantially conic segment 48, which diverges forwardly at substantially the same angle as 36, the passage forward surface and in with the closure member stowed position each closure member is translated forwardly into its respective passage 34, in which position it seals off the passage and conforms to the outer contours of the aft end of the shroud 16.

A blocker door 50 is mounted to have a stowed position to cover the forward inner end portion of each passage 34, and is attached to the shroud by pivotal mounting 52 for swinging about an axis transverse to the longitudinal axis of the shroud. Each door in stowed position defines a portion of the inner wall 26 of the shroud, and directly underlies its respective closure member when both are stowed. The trailing edge 56 of each door tapers rearward from the full width of the door to a point for purposes pointed out below.

FIGS. 2 and 3 illustrate the same construction as that shown in FIG. 1 applied to an installation in the tail portion of a fuselage provided with an upwardly extending vertical tail surface 58 and a horizontal tail surface 60 extending laterally to each side of the shroud. Also in FIGS. 2 and 3, the closure members 38 are shown deployed axially rearward to uncover the forward portions of their respective passages. These closure members are mounted for slidable fore and aft movement in the manner shown for the structure of FIGS. 4 and 5 to be described later herein, and may be actuated by any suitable or well known actuating means to move them to any desired extent between extreme positions. Conventional actuating means is also provided to move the doors 50 to any desired angular position within their range of movement. The location of the pivotal mounts for the doors is selected to make them "fail-safe", and the gas stream loads on the doors preferably are substantially balanced, but favor movement to stowed position in the event of actuator failure. The stowing tendency can be increased by the use of springs in a known manner. The closure members likewise may be spring biased toward stowed position, although they will not substantially affect forward thrust if they remain deployed.

With the closure members fully deployed rearward to their position of FIG. 2, the doors 50 may be swung rearwardly and inwardly until their leading edges 62 contact faces 48 provided on the leading ends of the respective closure members, and their trailing edges 56 contact each other as seen in FIG. 3. In this deployed position of the doors, they define a low generally conical structure extending completely across the interior of the shroud and totally blocking rearward flow of the exhaust stream out through the shroud. In this deployed position of the doors, their inner surfaces combine to define the forwardly convex conical structure which diverts the gas stream rearwardly and outwardly through the passages forwardly of the deflector surfaces 48 of the deployed closure members. Because of the contact of leading edges 62 of the doors with the forward surfaces 48 of the closure members, the inner surfaces of the doors and the surfaces 48 combine to produce a continuous, reversely curved guide path for the exhaust gas stream to direct it laterally outwardly and to impart a forward flow component thereto to produce the desired reverse thrust.

When it is desired to produce only intermediate thrust reversal while maintaining the engine at a high throttle setting, the doors are swung only to some selected intermediate position, in which their trailing edges are spaced apart as indicated in broken lines in FIG. 3. With the doors in this attitude, some of the jet propulsion gas stream passes rearwardly, and some is directed laterally outwardly to produce substantial deceleration forces without appreciably throttling the engine. If an emergency arises, the doors may be stowed and full power restored almost instantaneously. The actuators for the doors and the closure members preferably are independent of each other in installations where such operation is desirable as mentioned previously herein.

When the engine and thrust reverse are located in the tail portion of a fuselage, it is necessary to arrange the apparatus so that thrust reversal gases do not impinge on the tail surfaces. The arrangement of three passages with their closure members and blocker doors as shown in FIG. 3 accomplishes this result. The lower passage ejects gases downwardly and forwardly so as to clear the horizontal tail surfaces, and the upper two passages are angled outward so that gases issuing from them clear both the vertical and horizontal tail surfaces.

Figure 4:
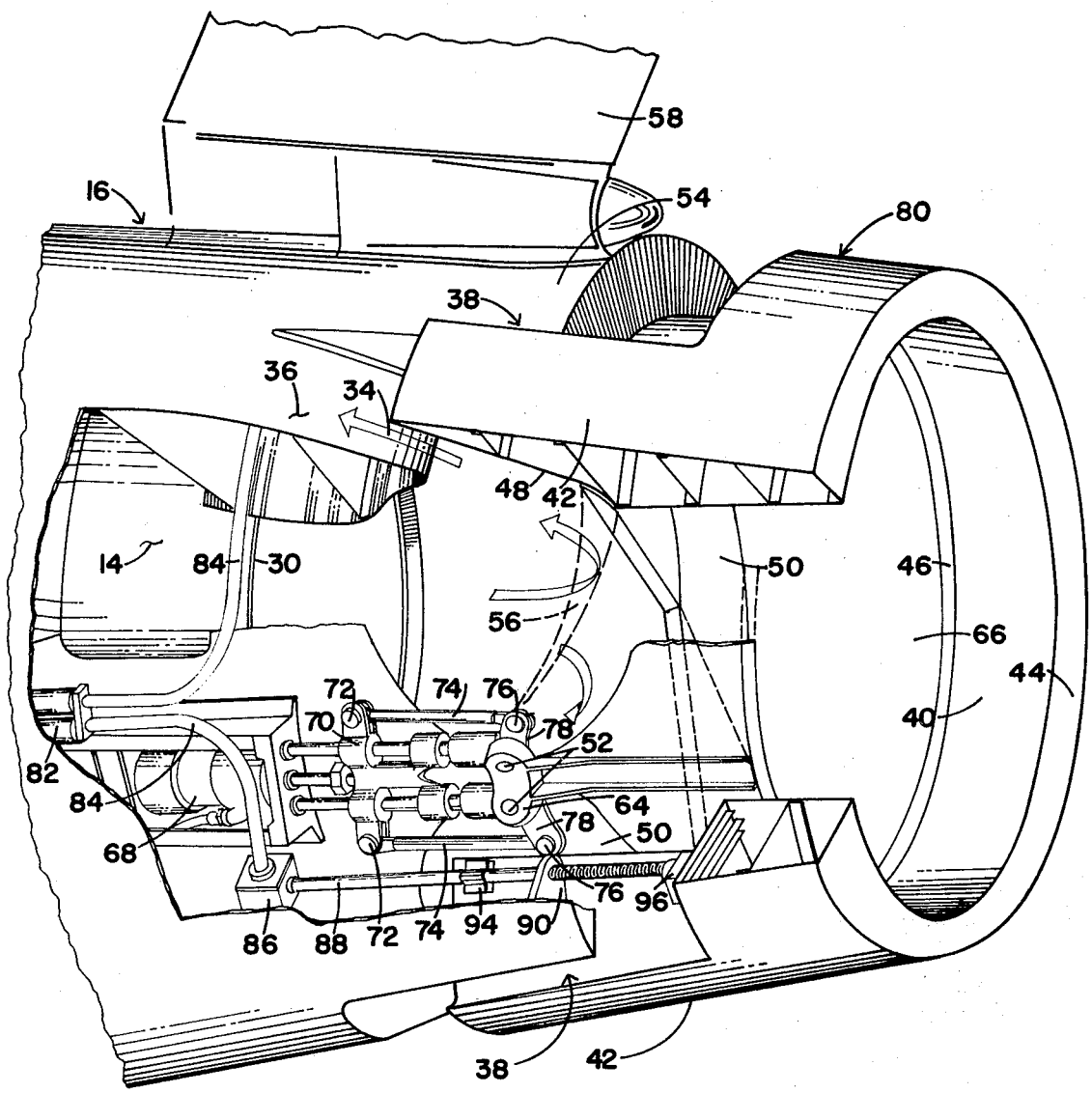
FIG. 4 is a fragmentary, schematic view in perspective illustrating the aft portion of a jet engine nacelle embodying a modified form of the invention.

The modification shown in FIG. 4 operates in basically the same way as the apparatus of FIGS. 1 to 3 and provides means to solidly support the closure members and integrate their movements while reducing the total amount of actuating hardware required.

As in the apparatus previously described, the blocker doors 50 are pivotally mounted at 52 on the brackets 64 which are part of the structure of the shroud inner sleeve 66. A rotary actuator 68 reciprocates a carriage 70 to which are pivotally connected at 72 a pair of push-pull rods 74. These rods in turn are pivotally connected at 76 to control horns 78 fixedly mounted on the blocker doors at points spaced from pivots 52 to produce the desired lever arm. The axial travel of carriage 70 is sufficient to swing the doors between fully stowed and fully deployed position. A similar construction is provided between each two adjacent blocker doors.

A continuous peripheral ring 80 forms the extreme aft portion of the shroud, and closure members 38 are formed integral with the ring and extend forward therefrom. The ring not only provides a sturdy structure to support the closure members but also insures that they will always operate in synchronism. The ring is reciprocated by a rotary actuator 82, flexible drive shaft 84, gear box 86 and combined support and drive shaft 88. The shaft is supported at its forward end by the gear box and at an intermediate point by bracket 90 which is fixedly carried by the aft projection 92 of the shroud. Ring 80 is provided with a forward bracket 94 which is slidable on shaft 88 and with an internally threaded boss 96 which receives the threaded aft end of shaft 88 for rotation and translation. Similar actuating means are provided at other points around the periphery of the shroud.

Figure 5:
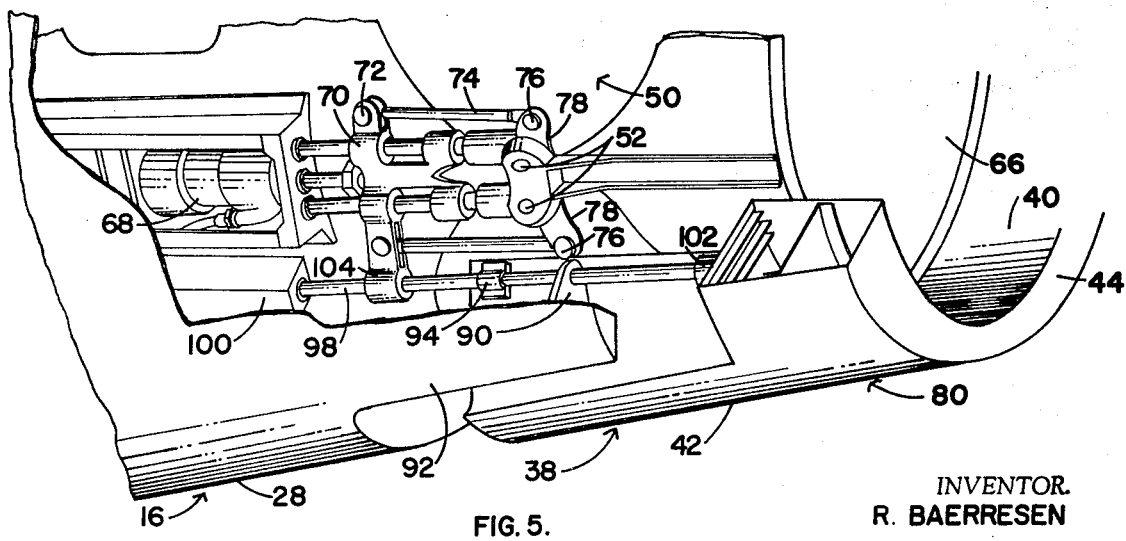
FIG. 5 is a fragmentary schematic view in perspective, generally similar to FIG. 4, but illustrating a further modified form of the invention.

In some commercial installations it is not essential to provide for modulation of reverse thrust, and it may be desired to provide common operating means for the doors and closure members, operating them in synchronism. The apparatus of FIG. 4 may be modified as shown in FIG. 5 to achieve this purpose. In this form, actuator 68 drives carriage 70 in the same manner as before. Shaft 98 is slidably mounted at its forward end in bearing 100 and is fixedly connected at its aft end to boss 102 on ring 80. The shaft passes through bracket 94 without relative movement but is slidable in bracket 90. Thus, ring 80 is supported on shaft 98 and the shaft is axially slidable to stow and deploy the ring and the closure members. An extension 104 on carriage 70 is fixedly connected to shaft 98 and therefore the latter will be reciprocated by axial movement of carriage 70. Thus, both the ring and the doors will be stowed and deployed in unison by the common actuating means. These means, of course, are repeated around the periphery as before.

The invention provides light weight, highly effective, all purpose thrust reversal means which is durable and inexpensive, both as to first cost and maintenance.

Having thus described the invention, what is claimed as new and useful and desired to be secured by U. S. Letters Patent is:

1. Thrust controlling apparatus for use in combination with a jet engine having a rearwardly discharging nozzle and adapted to produce reaction thrust, comprising: an elongate shroud of generally annular cross section connected to and surrounding the engine, the aft portion of the shroud extending rearwardly beyond the exit end of the nozzle to surround and control the exhaust gas stream issuing therefrom; a plurality of peripherally spaced passages extending through the wall of the aft portion of the shroud from the interior to the exterior thereof and aft of the plane of the exit end of the nozzle for outflow of exhaust gas on occasion to produce reverse thrust; a closure member for each of the passages movable along the axis of said shroud between stowed position overlying the passages and preventing flow therethrough and deployed position uncovering the passages for flow therethrough; and a blocker door for each passage pivotally mounted to the aft portion of the shroud for fore and aft swinging about axes transverse to the longitudinal axis of the shroud; the doors each being pivotally movable between fully stowed positions underlying the stowed closure members and blocking the inner ends of the passages and fully deployed positions engaging each other across the full width of the aft portion of the shroud to completely block rearward flow of the exhaust stream and re-direct it laterally outward through the passages.

2. Apparatus as claimed in claim 1; the shroud having radially spaced inner and outer walls; each blocker door in stowed position defining a portion of the contour of the inner wall of the shroud.

3. Apparatus as claimed in claim 1; the shroud having radially spaced inner and outer walls; each closure member in stowed position defining a portion of the contour of the outer wall of the shroud.

4. Apparatus as claimed in claim 1; the blocker doors being controllable to be maintained at any intermediate position to provide any desired degree of thrust reversal.

5. Apparatus as claimed in claim 1; the blocker doors and the closure members being operable independently of each other.

6. Apparatus as claimed in claim 1; and common means for operating the blocker doors and the closure members simultaneously.

7. Apparatus as claimed in claim 1; an annular ring forming the extreme aft portion of the shroud and the closure members being integral with the ring and extending forward therefrom; the ring being axially slidable forward to stowed position to cause the closure members to cover the passages and axially slidable aft to deployed position to cause the closure members to uncover the passages; and actuating means to move the ring between stowed and deployed positions.

8. Apparatus as claimed in claim 1; the number of passages and doors being at least three; the trailing edge of each door tapering rearward from the full width of the door to a point; the included angle being chosen to cause the trailing edges to engage in substantially complete sealing relation in the full blocking position.

9. Apparatus as claimed in claim 6; the pivotal mounting of the doors being so located that in full blocking position the inner surfaces of the doors form a forwardly convex cone to guide the exhaust stream outwardly and rearwardly toward the outflow passages.

10. Apparatus as claimed in claim 1; the closure members in stowed position being fully forward with their forward ends in contact with the forward ends of their respective passages, and in deployed position being fully aft with their forward ends axially spaced from the forward ends of the passages and serving to define the aft ends of the passages to guide outflow of the exhaust stream.

11. Apparatus as claimed in claim 8; the forward ends of the closure members having surfaces diverging forwardly and the forward ends of the passages having correspondingly shaped surfaces to mate in sealing engagement during closure; said surfaces cooperating upon deployment of the closure members to impart a forward flow component to the exhaust stream issuing through the passages.

12. Apparatus as claimed in claim 9; the pivotal mounting of the doors being so located that in full blocking position the inner surfaces of the doors form a forwardly convex cone to guide the exhaust stream outwardly and rearwardly toward the outflow passages and the leading edges of the doors engage the forward ends of the closure members to define a continuous, reversely curving guide path for the exhaust stream.

13. Apparatus as claimed in claim 1; the shroud constituting the aft portion of the fuselage of an airplane and having an upwardly extending vertical tail element and horizontal tail elements extending laterally in opposite directions from the longitudinal axis of the shroud; the passages being three in number; one of said passages opening downward beneath the horizontal tail element and the other two passages opening upward above the horizontal tail elements and angularly laterally to each side of the vertical tail element.

* * * * *